(12) United States Patent
Itoyama

(10) Patent No.: US 7,107,978 B2
(45) Date of Patent: Sep. 19, 2006

(54) ENGINE CONTROL SYSTEM

(75) Inventor: Hiroyuki Itoyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 39 days.

(21) Appl. No.: 10/888,583

(22) Filed: Jul. 12, 2004

(65) Prior Publication Data
US 2005/0114011 A1 May 26, 2005

(30) Foreign Application Priority Data
Aug. 4, 2003 (JP) .............................. 2003-285923

(51) Int. Cl.
F02D 41/18 (2006.01)

(52) U.S. Cl. ................. 123/683; 123/568.11; 123/399; 73/118.2

(58) Field of Classification Search ................ 123/683, 123/399, 568.11, 568.14; 73/118.2; 701/103
See application file for complete search history.

(56) References Cited

U.S. PATENT DOCUMENTS

| | | | |
|---|---|---|---|
| 5,159,914 A * | 11/1992 | Follmer et al. ............. | 123/494 |
| 6,032,656 A | 3/2000 | Naganuma et al. | |
| 6,089,082 A * | 7/2000 | Kotwicki et al. .......... | 73/118.2 |
| 6,122,589 A * | 9/2000 | Yamaguchi et al. ........ | 701/106 |
| 6,170,469 B1 | 1/2001 | Itoyama et al. | |
| 6,227,182 B1 * | 5/2001 | Muraki et al. ......... | 123/568.21 |
| 6,282,485 B1 * | 8/2001 | Kotwicki et al. ........... | 701/104 |
| 6,508,241 B1 | 1/2003 | Miller et al. | |
| 6,636,796 B1 * | 10/2003 | Kolmanovsky et al. ..... | 701/104 |
| 6,651,492 B1 * | 11/2003 | Kolmanovsky et al. .... | 73/118.2 |
| 6,802,299 B1 * | 10/2004 | Mischker et al. ........... | 123/480 |
| 2002/0107630 A1 | 8/2002 | Yagi | |

FOREIGN PATENT DOCUMENTS

| | | |
|---|---|---|
| EP | 1227233 A | 7/2002 |
| EP | 1239142 A2 | 9/2002 |
| JP | H09-242595 | 9/1997 |
| JP | 2001-123873 | 5/2001 |

* cited by examiner

Primary Examiner—Hai Huynh
(74) Attorney, Agent, or Firm—Shiniyu Global IP Counselors

(57) ABSTRACT

An engine control system is configured to improve the estimation accuracy of a fresh intake air quantity and a total intake air quantity that flows into the combustion chambers. The engine control system is configured to estimate an estimated EGR rate value Regr using a primary lag process for a target EGR rate, calculate a volumetric efficiency equivalency value based on the estimated EGR rate value Regr, estimate an estimated fresh intake air value Qac that flows into the combustion chamber based on a rate of change in a volumetric efficiency equivalency value $Kin/Kin_{n-1}$ of the estimated EGR rate value Regr and the volumetric efficiency equivalency value Kin, and estimate an estimated total intake air quantity value Qsco2 that includes the EGR gas based on the estimated fresh intake air value Qac and the estimated EGR rate value Regr.

18 Claims, 6 Drawing Sheets

ENGINE CONTROL SYSTEM

BACKGROUND OF THE INVENTION

1. Field of the Invention

The present invention generally relates to an engine control system. In particular, present invention generally relates to a technology that aims to improve the estimation accuracy of fresh intake air quantity and total intake air quantity that flows into the combustion chamber.

2. Background Information

In internal combustion engines such as diesel engines, an exhaust gas recirculating system (EGR system) is widely used wherein a part of the exhaust gas is recirculated to lower the combustion temperature in order to reduce discharge of nitrogen oxide (NOx). In some conventional engine control system, an airflow meter is used in some diesel engines to detect fresh intake air quantity values and output the detected fresh intake air quantity values to an engine control system for maximum smoke limit control and EGR control.

One example of such an engine control system is disclosed Japanese Laid-Open Patent Publication No. 2001-123873. Similarly, an airflow meter is used in some gasoline engines to detect fresh intake air quantity values for various controls in gasoline engines.

In view of the above, it will be apparent to those skilled in the art from this disclosure that there exists a need for an improved engine control system. This invention addresses this need in the art as well as other needs, which will become apparent to those skilled in the art from this disclosure.

SUMMARY OF THE INVENTION

It has been discovered that there are, however, unavoidable response lags and delays between the detected fresh intake air quantity values outputted by an airflow meter and the fresh intake air quantity that actually flows into the combustion chamber originating from the volume in the air intake passage from the airflow meter up to the combustion chamber. In particular, an airflow meter is normally installed upstream from the compressor and an intercooler of a supercharger of an engine equipped with a supercharger. Thus, the volume mentioned above tends to be large and response lag is also large. Originating from this type of response lag is the danger that the control accuracy of settings such as fuel injection quantity that utilize the detected fresh intake air quantity value. In particular, reductions in exhaust performance and power performance during transition periods such as acceleration and deceleration.

In addition, if EGR gas is introduced into the air intake passage on the downstream side from the airflow meter in an engine equipped with an EGR system, the intake air quantity (equivalent to intake oxygen quantity) that flows into the combustion chamber will increase with respect to the detected fresh intake air quantity value detected by the airflow meter. Because of this, the estimated intake air quantity value that flows into the combustion chamber is usually estimated taking the EGR rate into consideration. Because there were also response lags and delays due to the affect of the volume described above until changes in the intake air quantity due to the EGR gas appear. However, it was very difficult to estimate the fresh intake air quantity and the total intake air quantity that flow into the combustion chamber with good accuracy.

The operation state changes in engines with an adjustable intake valve. In particular, during transient operation there was a difference between the fresh intake air quantity detected by the airflow meter and the total intake air quantity that is actually drawn into the cylinders. It was also understood that the exhaust and operability were influenced in the same manner due to the most important parameters that determine the intake air quantity, for example, the requested injection period or ignition period being difficult to set as well as irregularities in the air-fuel ratio and discrepancies in combustion requests.

The prevent invention takes the above mentioned problems into consideration. One objective of the present invention is to provide a novel engine control system that can noticeably improve the estimation accuracy of the fresh intake air quantity and the intake air quantity that flows into the combustion chamber.

Accordingly, in accordance with one aspect of the present invention, an engine control system is provided that basically comprises a fresh intake air quantity detection section, an efficiency calculation section and a fresh intake air quantity estimation section. The fresh intake air quantity detection section is configured to output a detected value of fresh intake air quantity passing through an air intake passage. The efficiency calculation section is configured to calculate a volumetric efficiency equivalency value. The fresh intake air quantity estimation section is configured to estimate a predicted fresh intake air quantity value that flows into a combustion chamber based on the fresh intake air quantity detected value and a variation in the volumetric efficiency equivalency value.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
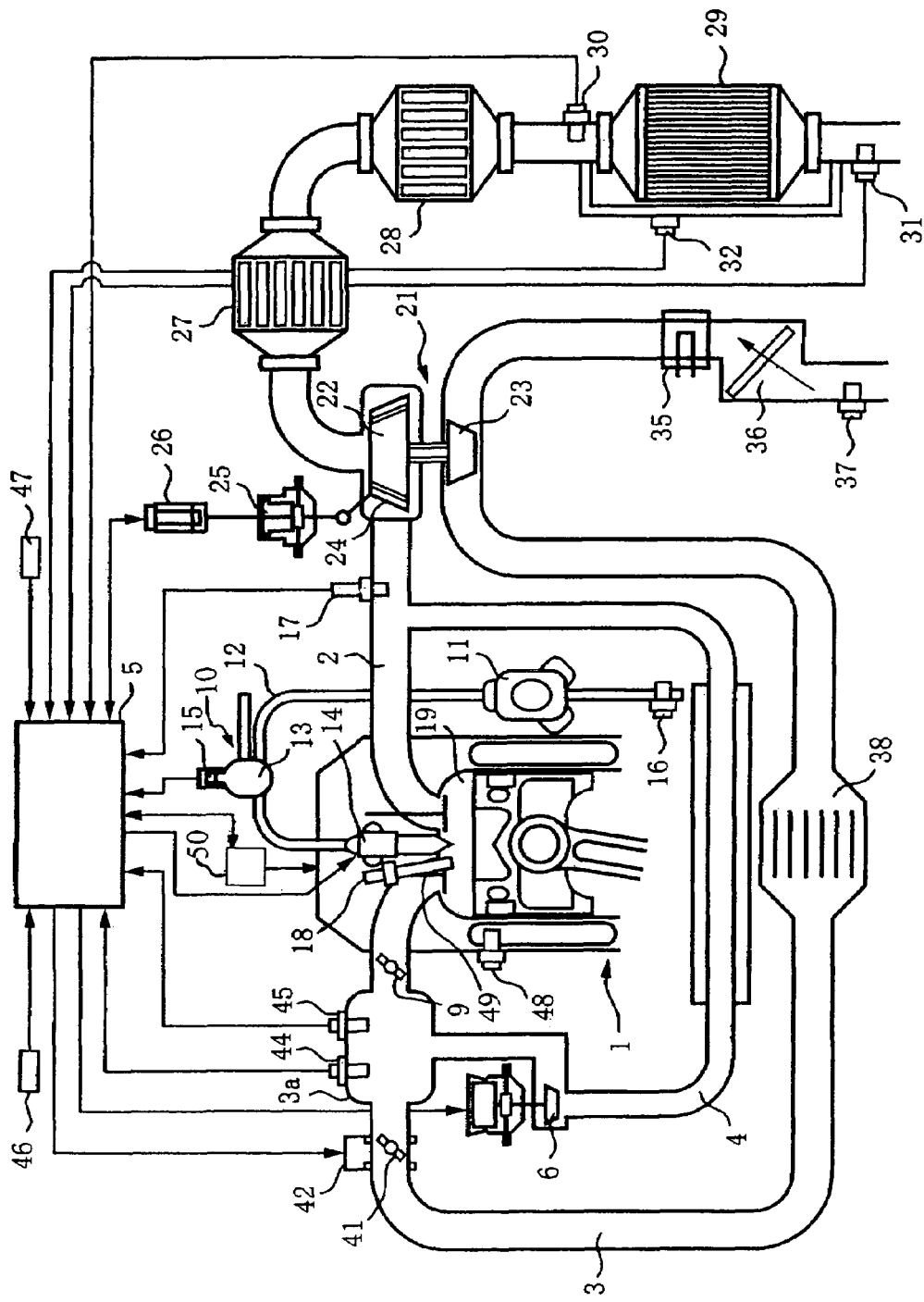
FIG. 1 is a schematic illustration of a diesel engine equipped with an engine control system in accordance with one embodiment of the present invention.

Referring initially to FIG. 1, an engine control system is illustrated for an internal combustion engine such as a supercharged diesel engine 1 in accordance with a first embodiment of the present invention. The engine control system in accordance with the present invention can be applied to other internal combustion engines used in automobiles and the like. The engine 1 preferably performs a comparatively large quantity of exhaust gas recirculation (EGR). In using the engine control system of the present invention, it is possible to noticeably improve the estimation accuracy of the estimated fresh intake air quantity that flows into the combustion chambers including during transition periods such as acceleration and deceleration. Consequently, not only can the control accuracy of setting the fuel injection quantity that utilize the detected fresh intake air quantity value be improved but also the exhaust performance and power performance can be improved as well.

The engine 1 has an exhaust passage 2 and an intake passage 3 with a collector 3a. An EGR passage 4 links the exhaust passage 2 to the collector 3a of the air intake passage 3. The operation of the engine 1 is controlled by an engine control unit 5. More specifically, the control unit 5 preferably includes a microcomputer with a control program that controls the engine 1 as discussed below. The control unit 5 can also include other conventional components such as an input interface circuit, an output interface circuit, and storage devices such as a ROM (Read Only Memory) device and a RAM (Random Access Memory) device. The microcomputer of the control unit 5 is programmed to control the various components of the engine 1. The memory circuit stores processing results and control programs that are run by the processor circuit. The control unit 5 is operatively coupled to the various components of the engine 1 in a conventional manner. The internal RAM of the control unit 5 stores statuses of operational flags and various control data. The control unit 5 is capable of selectively controlling any of the components of the control system in accordance with the control program. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Basically, the control unit 5 of the present invention is configured to use a fresh intake air quantity detection method to output a detected value of a fresh intake air quantity passing through the air intake passage 3, an efficiency calculation method that calculates a volumetric efficiency equivalency value, and a fresh intake air quantity estimation method that estimates an estimated fresh intake air quantity value that flows into the combustion chambers based on the fresh intake air quantity detected value and a variation in a volumetric efficiency equivalency value.

An EGR valve 6 is disposed in the EGR passage 4 and is operatively connected to the engine control unit 5. Preferably, the valve opening degree of the EGR valve 6 can be continuously and variably controlled by a stepping motor or any other device that can continuously and variably control the valve opening degree of the EGR valve 6. The valve opening degree of the EGR valve 6 is controlled by the engine control unit 5 to obtain a specified EGR rate in response to the operating conditions received by the engine control unit 5 from various operating condition sensors. In other words, the valve opening degree of the EGR valve 6 is variably controlled (EGR control method) so as to variably control the EGR rate towards a target EGR rate set by the engine control unit 5. For example, the EGR rate is set to a large EGR rate when the engine 1 is operating in a low-speed, low-load region, and as the engine speed and load becomes higher, the EGR rate becomes lower.

A swirl control valve 9 is provided in the intake passage 3 in the vicinity of an air intake port of the engine 1. The swirl control valve 9 is configured and arranged to produce a swirling flow inside the combustion chamber 19 depending on the operating conditions of the engine 1. The swirl control valve 9 is driven by an actuator (not shown) and opened and closed in response to a control signal from the control unit 5. For example, the swirl control valve 9 is preferably closed in a low load and low speed condition to produce a swirling flow inside the combustion chamber. The swirl control valve 9 is an air adjustment device that is controlled by an air adjustment section of the control unit 5 to affect the fresh intake air quantity drawn into the combustion chamber. In one embodiment of the present invention, the fresh intake air quantity estimation section of the control unit 5 is configured to adjust the volumetric efficiency equivalency value based on an operating state of the swirl control valve 9 as determined by the air adjustment section of the control unit 5 as explained below.

The engine 1 is also preferably equipped with a common rail fuel injection device 10. In this common rail fuel injection device 10, after fuel is pressurized by a high pressure fuel pump 11, the fuel is fed through a high-pressure fuel supply passage 12 such that the fuel accumulates in an accumulator 13 (common rail). The fuel is then distributed from this accumulator 13 to a plurality of fuel injection nozzles 14 for each of the engine cylinders. The control unit 5 is configured to control the opening and closing of the nozzles of each of the fuel injection nozzles 14 to inject fuel into the engine cylinders. The fuel pressure inside the accumulator 13 is variably adjusted by a pressure regulator (not shown) and a fuel pressure sensor 15 is provided in the accumulator 13 for detecting the fuel pressure. The fuel pressure sensor 15 is configured and arranged to output to the control unit 5 a fuel pressure signal that is indicative of the fuel pressure in the accumulator 13.

A fuel temperature sensor 16 is arranged upstream of the fuel pump 11. The fuel temperature sensor 16 is configured and arranged to detect the fuel temperature and output to the control unit 5 a signal that is indicative of the fuel temperature. In addition, a conventional glow plug 18 is arranged in the combustion chamber 19 of each of the engine cylinders to ignite the fuel in each combustion chamber 19.

A wide-range air fuel ratio sensor 17 is provided on the upstream side of the exhaust turbine 22. The air-fuel ratio sensor 17 is configured and arranged to detect the air fuel ratio of the exhaust gas. Thus, the air-fuel ratio sensor 17 is further configured and arranged to output to the control unit 5 a signal that is indicative of the exhaust air-fuel ratio.

The engine 1 has a variable-capacity turbo supercharger 21 equipped with a coaxially arranged exhaust turbine 22 and a compressor 23. The compressor 23 functions as an air adjustment device of the engine control system that is configured to affect the fresh intake air quantity drawn into the combustion chamber. In other words, the compressor 23 is an air adjustment device that is controlled by an air adjustment section of the control unit 5 to affect or otherwise influence the fresh intake air quantity drawn into the combustion chamber. In one embodiment of the present invention, the fresh intake air quantity estimation section of the control unit 5 is configured to adjust the volumetric efficiency equivalency value based on an operating state of the compressor 23 as determined by the air adjustment section of the control unit 5.

The exhaust turbine 22 is positioned in the exhaust passage 2 at a position downstream of a portion where the EGR passage 4 connects to the exhaust passage 2. In order to vary a capacity of the turbo supercharger 21, the turbo supercharger 21 is provided with a variable nozzle 24 or a capacity adjusting device arranged at a scroll inlet of the exhaust turbine 22. In other words, a capacity of the turbo supercharger 21 can be varied depending on the engine operating conditions. For example, a relatively small capacity of the turbo supercharger 21 is preferably achieved by reducing an opening degree of the variable nozzle 24 when the exhaust gas flow rate is relatively small (such as a low speed region). On the other hand, a relatively large capacity is preferably achieved by increasing the opening degree of the variable nozzle 24 when the exhaust gas flow rate is relatively large (such as a high speed region). The variable nozzle 24 is preferably driven by a diaphragm actuator 25 configured to respond to a control pressure (negative control pressure), and the control pressure is generated using a duty-controlled pressure control valve 26.

The exhaust system of the engine 1 includes an oxidation catalytic converter 27 disposed in the exhaust passage 2 on the downstream side of the exhaust turbine 22. The oxidation catalytic converter 27 has an oxidation catalyst that oxidizes, for example, CO and HC contained in the exhaust gas. The exhaust system of the engine 1 also includes a NOx trapping catalytic converter 28 that is configured to treat NOx in the exhaust passage 2 on the downstream side of the oxidation catalytic converter 27. Thus, the oxidation catalytic converter 27 and the NOx trapping catalytic converter 28 are arranged in sequence in the exhaust passage 2 downstream of the exhaust gas turbine 22. This NOx trapping catalytic converter 28 is configured and arranged to adsorb NOx when the exhaust air-fuel ratio of the exhaust flowing into the NOx trapping catalytic converter 28 is lean. Thus, the oxygen density of the exhaust flowing into the NOx trapping catalytic converter 28 drops. When an oxygen concentration of the exhaust gas decreases, the NOx trapping catalytic converter 28 releases the adsorbed NOx and cleans the exhaust gas by catalytic action so as to perform a purification process.

The exhaust system of the engine 1 also includes an exhaust gas after-treatment system such as a particulate filter 29 (diesel particulate filter: DPF) that is equipped with a catalyst for collecting and removing exhaust particulate matter (particulate matter or "PM"). The particulate filter 29 is provided on the downstream side of the NOx trapping catalytic converter 28. The particulate filter 29 is constructed, for example, with a wall flow honeycomb structure (alternate cannel end blocked type) having a solid-cylindrical filter material such as cordierite with a plurality of honeycomb-shaped, fine passages formed therein and the alternate ends of the passages are closed.

The exhaust system of the engine 1 also includes a filter inlet temperature sensor 30 and a filter outlet temperature sensor 31 that are provided on the inlet side and outlet side of the particulate collection filter 29, respectively. The temperature sensors 30 and 31 are configured and arranged to detect the exhaust temperature at the inlet side and outlet side, respectively. Thus, the temperature sensors 30 and 31 are further configured and arranged to output to the control unit 5 a signal that is indicative of the exhaust temperature at the inlet side and outlet side, respectively.

Since a pressure loss of the particulate filter 29 changes as the exhaust particulate matter accumulates, a pressure difference sensor 32 is provided to detect the pressure difference between the inlet and outlet of the particulate collection filter 29. Of course, it will be apparent to those skilled in the art from this disclosure that, instead of using the pressure difference sensor 32 to detect the pressure difference directly, separate pressure sensors can be provided at the inlet and the outlet of the particulate filter 29 to find the pressure difference based on the two pressure values. A muffler (not shown) is also preferably disposed downstream of the particulate collection filter 29.

The intake air system of the engine 1 preferably includes an airflow meter 35 that is configured and arranged to detect a fresh intake air quantity passing through the air intake passage 3. The airflow meter 35 is provided on the upstream side of the compressor 23 in the air intake passage 3. The airflow meter 35 is configured and arranged to output to the control unit 5 a signal that is indicative of the fresh intake air quantity passing through the air intake passage 3.

The intake air system of the engine 1 preferably includes an air filter 36 and an atmospheric pressure sensor 37 that are positioned on the upstream side of the airflow meter 35. The atmospheric pressure sensor 37 configured and arranged to detect outside pressure, i.e., atmospheric pressure. The atmospheric pressure sensor 37 is provided at the inlet of the air filter 36. The atmospheric pressure sensor 37 is configured and arranged to output to the control unit 5 a signal that is indicative of the outside air pressure entering the air intake passage 3.

The intake air system of the engine 1 preferably includes an intercooler 38 to cool the high-temperature supercharged air. The intercooler 38 is disposed in the air intake passage 3 between the compressor 23 and a collector 3*a*.

In addition, the intake air system of the engine 1 preferably includes an intake air throttle valve 41 that is configured to restrict the fresh intake air quantity. The intake air throttle valve 41 is installed in the air intake passage 3 on the inlet side of the collector 3*a* of the air intake passage 3. The opening and closing of this intake air throttle valve 41 is driven by control signals of the engine control unit 5 through an actuator 42 that preferably includes a stepper motor or the like. Further, a supercharging pressure sensor 44 that detects supercharging pressure and an intake temperature sensor 45 that detects intake air temperature are provided in the collector 3*a*.

The control unit 5 is configured and arranged to control a fuel injection quantity and a fuel injection timing of the fuel injection device 10, the opening degree of the EGR valve 6, the opening degree of the variable nozzle 24, and other components and functions of the engine 1. Moreover, in addition to the various sensors installed in the engine 1 as mentioned above, the control unit 5 is configured and arranged to receive detection signals from an accelerator position sensor 46 for detecting a depression amount of the accelerator pedal, an engine rotational speed sensor 47 for detecting the rotational speed of the engine, and a temperature sensor 48 for detecting the temperature of the engine coolant.

In relation to the first embodiment of the present invention, the control unit 5 carries out the functions of a fresh intake air quantity detection section, an efficiency calculation section, a fresh intake air quantity estimation section, an EGR control section, an EGR estimation section and a total intake air quantity equivalent value estimation section. Basically, the fresh intake air quantity detection section of the control unit 5 is configured to output a detected value of fresh intake air quantity passing through an air intake passage based on the signal from the airflow meter 35. The efficiency calculation section of the control unit 5 is configured to calculate a volumetric efficiency equivalency value, as explained below. The fresh intake air quantity estimation section of the control unit 5 is configured to estimate a predicted fresh intake air quantity value that flows into a combustion chamber based on the fresh intake air quantity detected value and a variation in the volumetric efficiency equivalency value, as explained below. The EGR control section of the control unit 5 is configured to control EGR towards at least one of a target EGR rate and a target EGR quantity by controlling the opening degree of EGR valve 6. The EGR estimation section of the control unit 5 is configured to estimate a predicted EGR value of at least one of an actual EGR rate and an actual EGR quantity based on the at least one of the target EGR rate and the target EGR quantity as explained below. The total intake air quantity equivalent value estimation section of the control unit 5 is configured to estimate a predicted total intake air quantity equivalent value that flows into the combustion chamber based on the predicted EGR value and the predicted value of fresh intake air quantity as explained below.

The control operations executed by the control unit 5 will now be described with reference to the functional block diagram of FIG. 2. Many of the functions described below are functions that can be executed using software processing. First, the processing for determining or calculating the estimated fresh intake air value Qac that flows into the combustion chamber 19 and calculating the estimated total intake air quantity value Qsco2 (estimated value of oxygen quantity drawn into the combustion chamber 19). The estimated total intake air quantity value Qsco2 is an estimated value of the total intake air quantity equivalent value that includes both fresh intake air and recirculated exhaust gas entering the cylinders. This routine is repeatedly executed by the engine control unit 5 for each specified period (for instance, at a specified crank angle or every 10 ms).

In step S1, an estimated EGR rate value Regr is calculated or estimated based on a target EGR rate or a target EGR quantity that constitutes an EGR estimation method or section of the control unit 5. As described in Japanese Laid-Open Patent Publication No. 2001-123873 mentioned above, the target EGR rate or quantity is preferably calculated by using a map based on the engine speed (RPMs), the target fuel injection quantity and the engine coolant temperature. The valve opening degree of the EGR valve 6 is controlled to produce this target EGR rate or quantity. The actual EGR rate or quantity, however, lags behind the target EGR rate or quantity during the transition periods in which the EGR rate or quantity changes suddenly due to the response lags of the EGR gas caused by the capacity (volume) of the EGR passage 4 and the collector 3a. Thereupon, the estimated EGR rate value Regr is found by using a known primary lag process and a delay process which utilize the target EGR rate.

In step S2, a volumetric efficiency equivalency value Kin that is equivalent to the volume efficiency and filling efficiency of the engine is calculated using the following Equation (1) (efficiency calculation method).

$$Kin = \frac{f(Ne) \times G(Regr) \times Pcol}{Pa} \quad (1)$$

In Equation (1), the term Ne is the engine speed or RPMs detected by the engine rotational speed sensor 47, the term Pcol is the supercharging pressure detected by the supercharging pressure sensor 44 and the term Pa is the atmospheric pressure detected by the atmospheric pressure sensor 37. The coefficient f(Ne) is obtained by a map based on the engine speed Ne. The coefficient G(Regr) is obtained by a map based on the estimated EGR rate value Regr. The coefficient G(Regr) is set to become smaller as the estimated EGR rate value Regr becomes larger. In other words, the volumetric efficiency equivalency value Kin is calculated based on the engine speed Ne, the supercharging pressure Pcol and the estimated EGR rate value Regr. Basically, step S2 constitutes an efficiency calculation section of the control unit 5.

In step S3, the estimated fresh intake air value Qac that flows into the combustion chamber 19, i.e., the drawn in fresh intake air quantity, excluding the EGR gas, is calculated or estimated using the following Equations (2) and (3) (fresh intake air quantity estimation method).

$$Qac = \frac{\frac{Qac_{n-1}}{Kin_{n-1}} \times Kkvol + Qacb}{1 + \frac{Kkvol}{Kin}} \quad (2)$$

$$Kkvol = \frac{120 \times Vcol}{Ve \times Ne \times dT} \quad (3)$$

Figure 2:
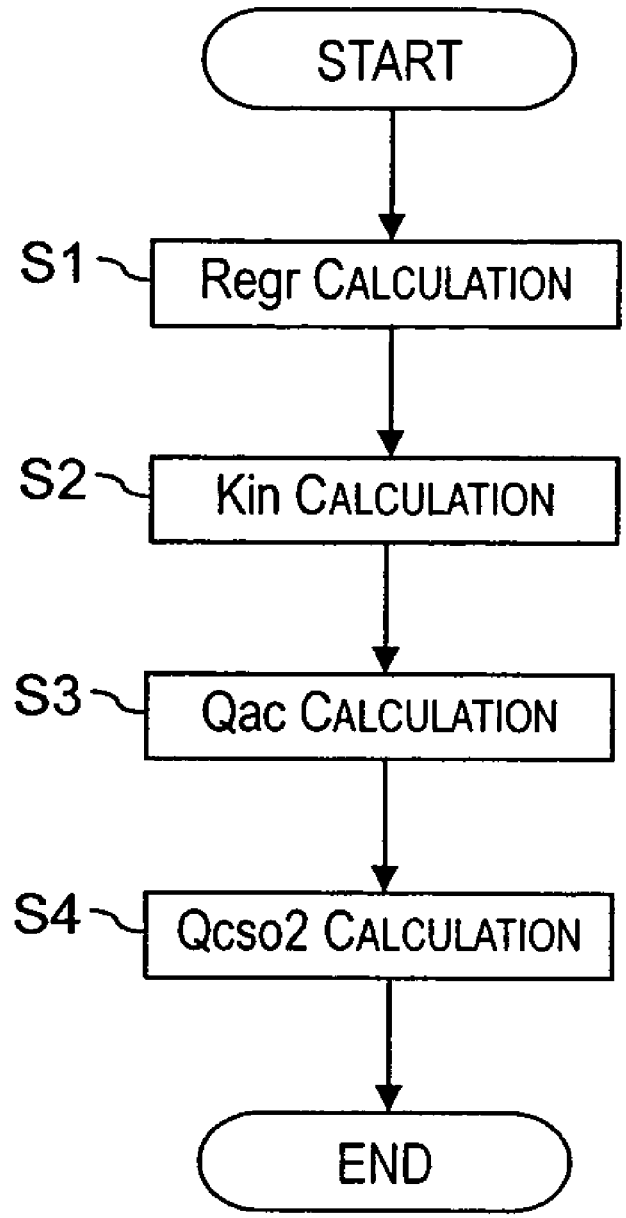
FIG. 2 is an operational flowchart showing the calculation processing by the engine control system to obtain an estimated fresh intake air value and an estimated total intake air quantity in accordance with the present invention.

In Equations 2 and 3 above, the term $Qac_{n-1}$ is the last calculated value of the estimated fresh intake air value Qac, the term $Kin_{n-1}$ is the last calculated value of the volumetric efficiency equivalency value Kin, the term Qacb is the detected fresh intake air quantity value detected by the airflow meter 35, the term Ve is the exhaust quantity and the term dT is the calculation interval (execution interval of routine shown in FIG. 2). The ratio $Kin/Kin_{n-1}$ is equivalent to changes (rate) of the volumetric efficiency equivalency value. Basically, step S3 constitutes a fresh intake air quantity estimation section of the control unit 5.

In other words, the estimated fresh intake air value Qac is estimated based on the detected fresh intake air quantity value Qacb and changes in the ratio $Kin/Kin_{n-1}$, i.e, in the volumetric efficiency equivalency value. Stated another way, the term Qac is found by the primary lag Equation (2) that uses the last calculated values $Qac_{n-1}$ and $Kin_{n-1}$. As is apparent from Equation (2), the estimated fresh intake air value Qac becomes larger as the ratio $Kin/Kin_{n-1}$ becomes larger. The estimated fresh intake air value Qac also becomes larger as the ratio $Qac_{n-1}/Kin_{n-1}$ of the last calculated value becomes larger.

In step S4, the estimated value of the total intake air quantity Qsco2, which includes EGR gas that flows into the combustion chamber 19, is calculated and estimated by the following Equation (4) (total intake air quantity equivalent value estimation method).

$$Qcso2 = Qac\left(1 + Regr\frac{\lambda_0 - 1}{\lambda_0}\right) \quad (4)$$

In other words, the estimated total intake air quantity value Qsco2 is estimated based on the estimated fresh intake air value Qac, the estimated EGR rate value Regr and the air-fuel ratio $\lambda_0$. The estimated fresh intake air value Qac and the estimated total intake air quantity value Qsco2 that are found in this manner are used in various control processes. For example, the estimated total intake air quantity value Qsco2 is used in the setting process for the target fuel injection quantity and the air-fuel ratio control. Basically, step S4 constitutes a total intake air quantity equivalent value estimation section of the control unit 5.

Figure 3:
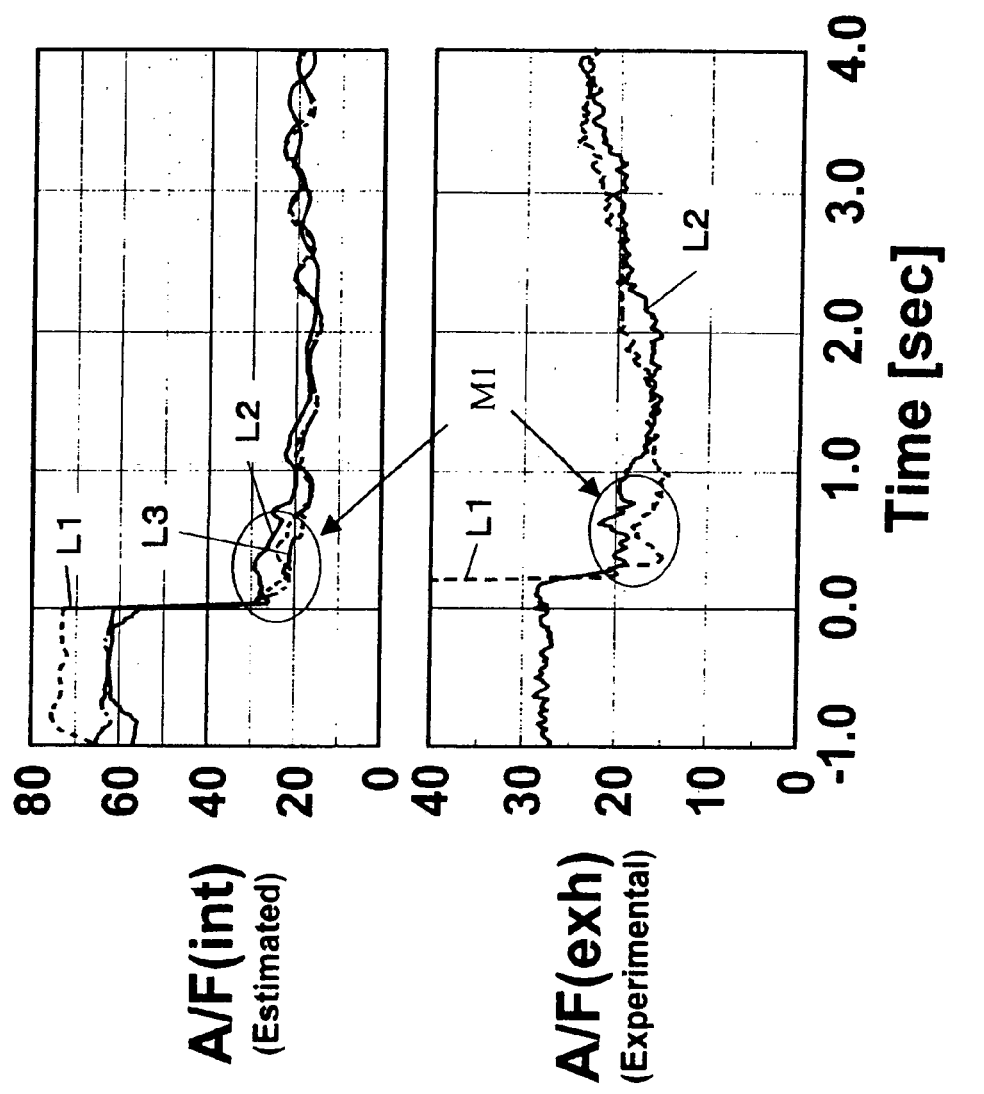
FIG. 3 is a pair of timing charts showing estimated and experimental combustion ratio characteristics close to the acceleration transition period.
Figure 4:
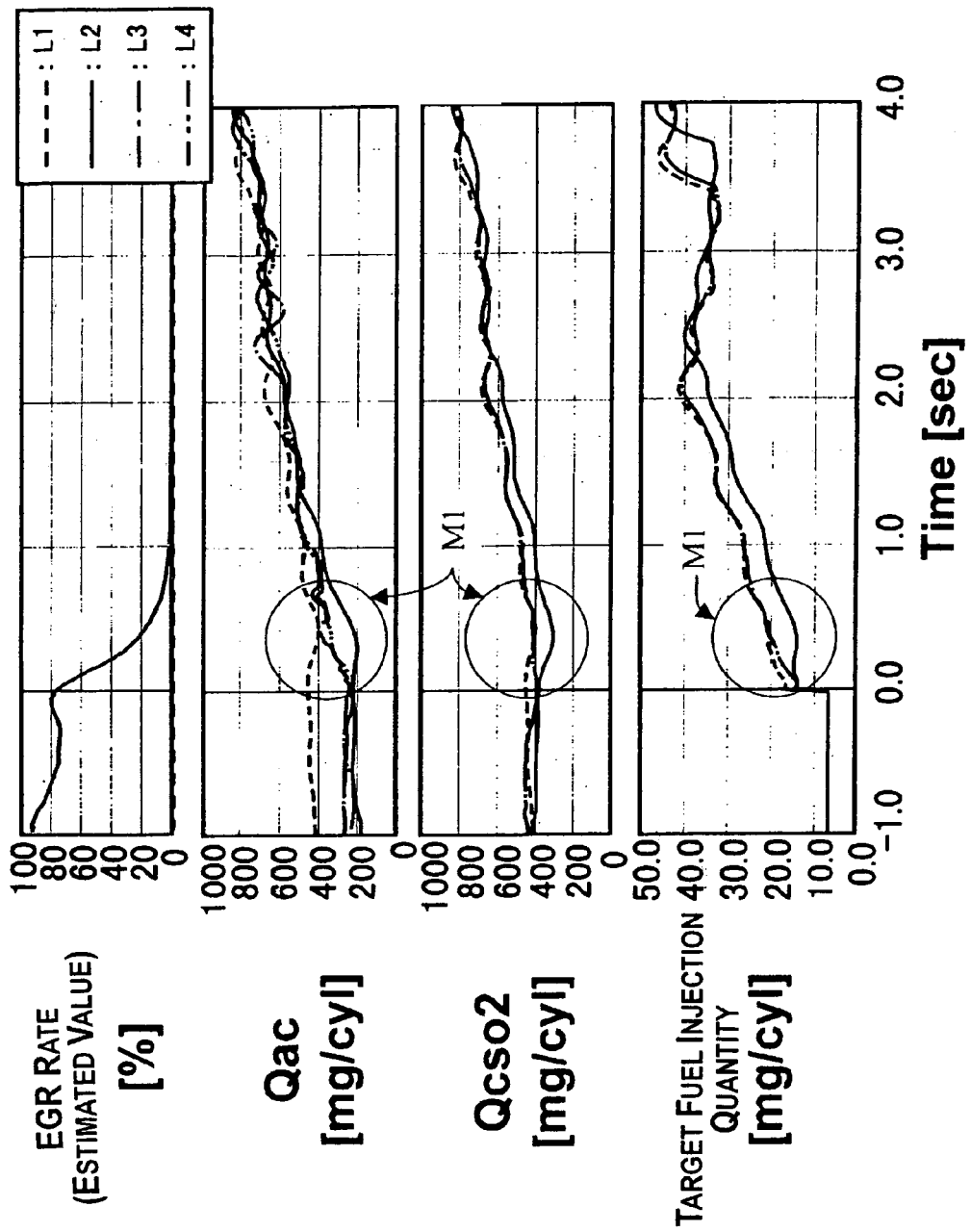
FIG. 4 is a set of timing charts showing characteristics of the EGR rate, the fresh intake air quantity, the total intake air quantity and the fuel injection quantity close to the acceleration transition period.
Figure 5:
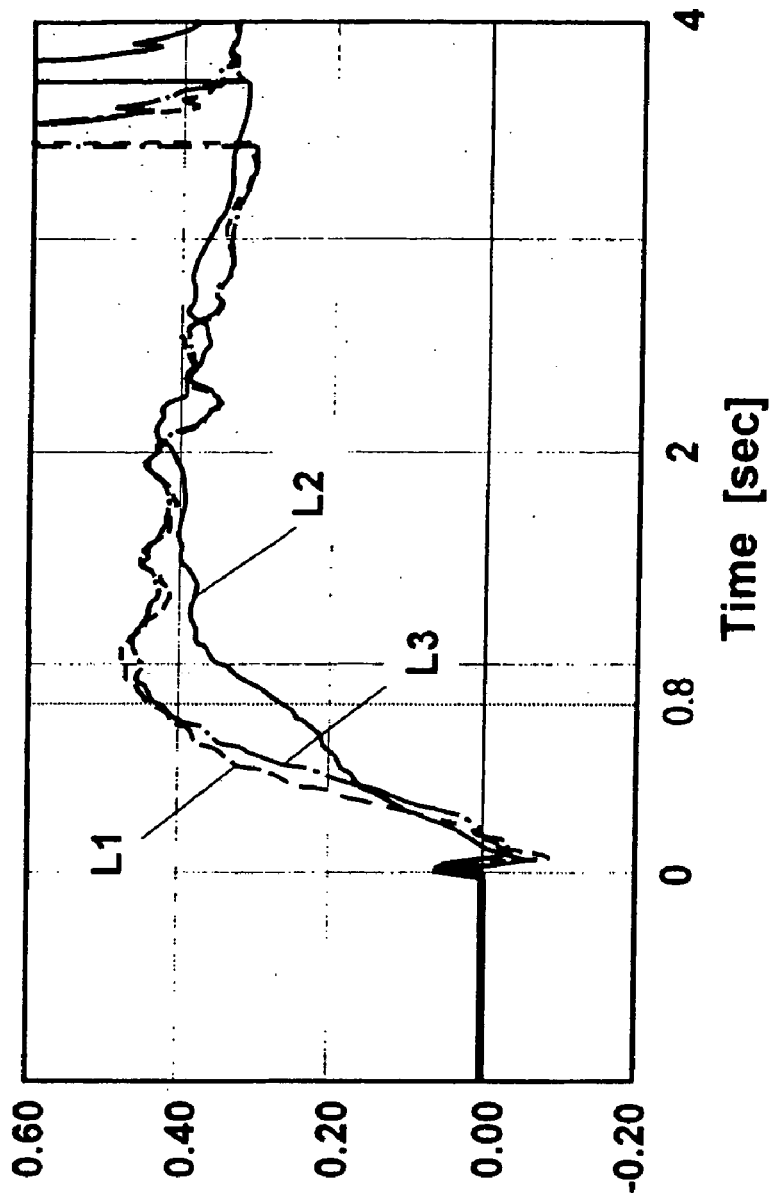
FIG. 5 is a timing chart showing vehicle acceleration characteristics close to the acceleration transition period.

Referring now to FIGS. 3, 4 and 5, timing charts are shown that are close to the acceleration transition period during which the actual EGR rate (estimated EGR rate value) suddenly drops. In the FIGS. 3, 4 and 5, the timing 0.0 is equivalent to the acceleration start period. The characteristic line L1 shows when the EGR rate (EGR gas quantity/fresh intake air quantity×100) is 0%. In other words, the characteristic line L1 shows a characteristic without any EGR gas being introduced. This characteristic without any EGR gas being introduced is an expected characteristic that has no response lag due to EGR gas. This characteristic is also equivalent to a target characteristic when EGR gas is being introduced. The characteristic line L2 shows a conventional characteristic of the estimated fresh intake air value Qac and the estimated total intake air quantity value Qsco2 using an ordinary control process without the control related to this embodiment as described above being applied to the setting process of Qac and Qcso2. The characteristic line L3 shows a working characteristic when the control of this embodiment as described above is applied to the setting process of the estimated fresh intake air value Qac and the estimated total intake air quantity value Qsco2. The characteristic line L4 corresponds to the fresh intake air quantity and the intake air quantity actually introduced to the combustion chambers 19. In other words, the actual characteristic line L4 corresponds to the target characteristic. The region enclosed by the period M1 is equivalent to the acceleration transition period during which the EGR rate drops suddenly mainly due to the acceleration.

As shown in FIG. 3, in the conventional characteristic line L2, the air-fuel ratio temporarily shifts towards the lean side in comparison with the target characteristic line L1 without any EGR gas introduced during the acceleration transition period M1 wherein the EGR rate drops. In other words, as shown in FIG. 4, during the acceleration transition period M1, the estimated fresh intake air value Qac becomes lower with respect to the actual target characteristic line L4 along with the estimated total intake air quantity value Qsco2 becoming lower with respect to the target characteristic line L1 without any EGR gas being introduced. Because of this, the fuel injection quantity also becomes lower with respect to the target characteristic line L1. As shown in FIG. 5, the acceleration G is insufficient with respect to the target characteristic line L1 without any EGR gas being introduced. Namely, insufficient acceleration occurs during the acceleration transition period M1.

In contrast to this, as shown in FIG. 3, for the working characteristic line L3, the air-fuel ratio does not temporarily shift towards the lean side as in the conventional characteristic line L2 during the acceleration transition period M1 wherein the EGR rate drops and almost coincides with the target characteristic line L1 without any EGR gas being introduced including the acceleration transition period M1. In other words, as shown in FIG. 4, including the acceleration transition period M1, the estimated fresh intake air value Qac almost coincides with the actual characteristic line L4 along with the estimated total intake air quantity value Qsco2 having an accuracy that closely coincides with the target characteristic line L1 without any EGR gas being introduced. Reductions in accuracy due to fluctuations in the EGR rate are almost eliminated in the working characteristic line L3 in this manner. This results in a remarkable improvement in the estimation accuracy of the estimated fresh intake air value Qac and the estimated total intake air quantity value Qsco2. Consequently, the fuel injection quantity set using the estimated total intake air quantity value Qsco2 almost coincides with the target characteristic line L1 without any EGR gas being introduced. As shown in FIG. 5, favorable acceleration characteristics can be obtained in which the working characteristic line L3 are almost identical to the target characteristic line L1 without any EGR gas being introduced.

Figure 6:
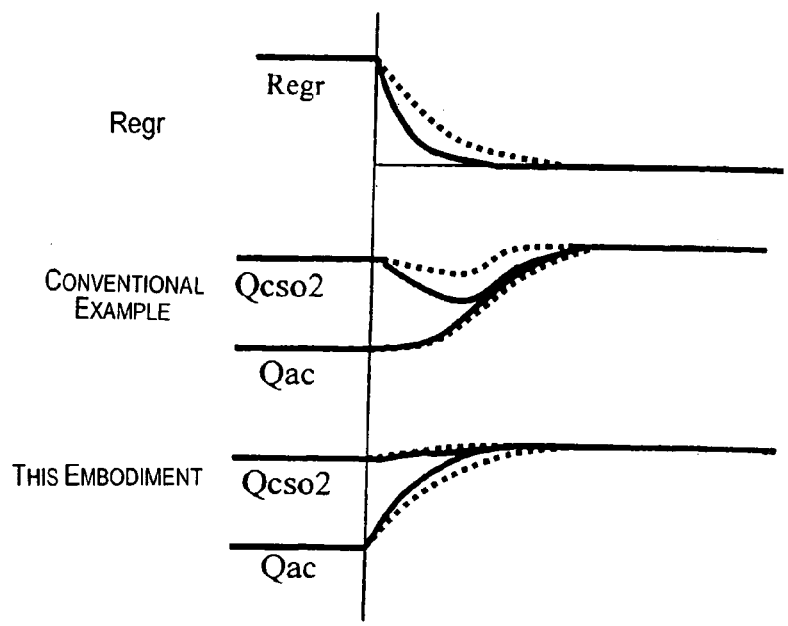
FIG. 6 is a set of characteristics charts for showing advantages achieved by the engine control system in accordance with the present invention.

Referring to FIG. 6, the broken characteristic lines show estimated values and the solid characteristic lines show actual values. For the estimated EGR rate value Regr, there is danger that errors might occur in the actual EGR rate (the solid characteristic lines) particularly during transition periods. In this embodiment, the estimated EGR rate value Regr is used to calculate the estimated fresh intake air value Qac. Then this estimated fresh intake air value Qac and this estimated EGR rate value Regr again are used to calculate the estimated total intake air quantity value Qsco2 thereby canceling or reducing the affects of the estimated EGR rate value Regr errors in the estimated total intake air quantity value Qsco2. Consequently, the errors between the estimated intake air quantity value Qcso2 and the actual intake air quantity, including transition periods, are sufficiently small thereby improving the estimation accuracy of the estimated total intake air quantity value Qsco2. The maximum injection quantity setting that uses this estimated total intake air quantity value Qsco2 and the control accuracy of the $\lambda$ control are improved as well.

ALTERNATE EMBODIMENTS

Basically, in accordance with an alternate embodiment of the present invention, the engine control system of FIG. 1 is modified such that the control unit 5 uses the intake valve operating state of intake values 49 to calculate the volumetric efficiency equivalency value Kin instead of using the estimated EGR rate value Regr of the prior embodiment. In particular, the open degree and timing of the intake valves 49 are adjustable by a variable mechanism so that is controlled by control unit 5. The intake valve opening state is sent to the control unit 5 by a lift sensor of the variable intake valve mechanism 50.

Figure 7:
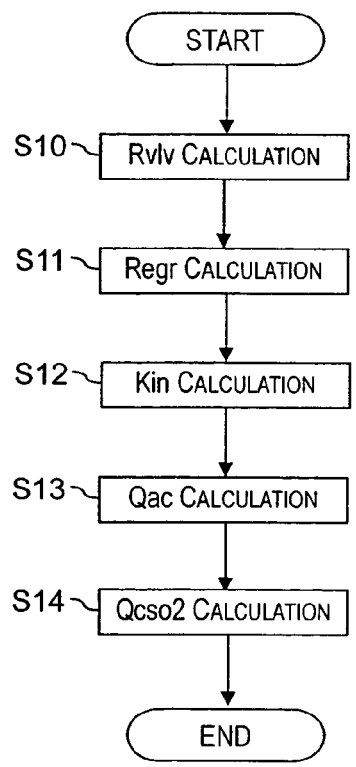
FIG. 7 is an operational flowchart showing the calculation processing by the engine control system to obtain an estimated fresh intake air value and an estimated total intake air quantity of in accordance with another embodiment of the present invention.

In other words, in this alternate embodiment of the present invention, the control unit 5 uses an alternate flow chart of FIG. 7 instead of the flow chart of FIG. 2. Basically, the control operations illustrated by the alternate flow chart of FIG. 7 are the same as those in the flow chart of FIG. 2, discussed above, except for steps S10, S12 and S13.

In relation to this embodiment of the present invention, the control unit 5 of FIG. 1 is configured and arranged to carry out the functions of a fresh intake air quantity detection section, an efficiency calculation section, a fresh intake air quantity estimation section, an air adjustment section, an intake valve control section, an intake valve operating state predicting section and a total intake air quantity equivalent value estimation section. Basically, the fresh intake air quantity detection section of the control unit 5 is configured to output a detected value of fresh intake air quantity passing through an air intake passage. The efficiency calculation section of the control unit 5 is configured to calculate a volumetric efficiency equivalency value, as explained below. The fresh intake air quantity estimation section of the control unit 5 is configured to estimate a predicted fresh intake air quantity value that flows into a combustion chamber based on the fresh intake air quantity detected value and a variation in the volumetric efficiency equivalency value, as explained below. The air adjustment section of the control unit 5 is configured to effect the fresh intake air quantity drawn into the combustion chamber, and thus, the fresh intake air quantity estimation section of the control unit 5 is configured to adjust the calculate the volumetric efficiency equivalency value based on an operating state detected by the air adjustment section of the control unit 5 as explained below.

The intake valve control section of the control unit 5 is configured to control adjustments of the variable intake valve mechanism 50. The intake valve operating state predicting section of the control unit 5 is configured to predict the operating state of the variable intake valve mechanism 50 based on a signal therefrom.

The flowchart of FIG. 7 shows the calculation processing of the estimated fresh intake air value Qac that flows into the combustion chambers 19 and the estimated total intake air quantity value Qsco2. This routine is, for example, repeatedly executed by the engine control unit 5 for each specified period (for instance, a specified crank angle or every 10 ms).

In step S10, an estimated operating state value Rvlv is determined that takes in account operating lags of a control circuit actuator or operating state detected by a lift sensor of the variable intake valve mechanism 50. In other words, the estimated operating state value Rvlv is determined based on a target intake valve operating state. For example, the estimated operating state value Rvlv is based on a valve lift amount of the intake valves 49. Thus, step S10 constitutes a variable valve operating state estimation method or section of the control unit 5.

In one possible method, the target intake valve operating state is calculated by using a pre-stored map that is based on the engine speed Ne or RPMs, the target fuel injection quantity and the engine coolant temperature. The actuator of the variable intake valve mechanism 50 is driven and controlled by the control unit 5 towards this target intake valve operating state by the intake valve control section of the control unit 5. For example, the actuator changes the operating state through an oil pressure circuit. Alternatively, the actuator is operated by an electromagnetic drive. Although a response lag exists, to a certain extent, in this operation, the actual intake valve operating state lags behind in the target intake valve operating state during transition periods wherein the command values change suddenly. Thereupon, the estimated operating state value Rvlv of the intake valve operating state is found by using a known primary lag process and a known delay process of the target operating state.

In step S11, the estimated EGR rate value Regr is calculated or estimated based on a target EGR rate or a target EGR quantity in the same manner as the first embodiment of FIG. 2. Thus, step S11 basically constitutes an EGR estimation method or section of the control unit 5. As mentioned above, the target EGR rate or quantity is preferably calculated by using a map based on the engine speed (RPMs), the target fuel injection quantity and the engine coolant temperature as described in Japanese Laid-Open Patent Publication No. 2001-123873. The valve opening degree of the EGR valve 6 is controlled to produce this target EGR rate or quantity. The actual EGR rate or quantity, however, lags behind the target EGR rate or quantity during the transition periods in which the EGR rate or quantity changes suddenly due to the response lags of the EGR gas caused by the capacity (volume) of the EGR passage 4 and the collector 3a. Thereupon, the estimated EGR rate value Regr is found by using a known primary lag process and a delay process which utilize the target EGR rate.

In step S12, the volumetric efficiency equivalency value Kin equivalent to the volume efficiency and filling efficiency of the engine is calculated using the following Equation (5) (efficiency calculation method).

$$Kin = \frac{f(Ne) \times G(Rvlv) \times Pcol}{Pa} \quad (5)$$

In Equation (5), the term Pcol is the supercharging pressure detected by the supercharging pressure sensor 44 and the term Pa is atmospheric pressure detected by the atmospheric pressure sensor 37. The coefficient f(Ne) is obtained by a map based on the engine speed Ne. The coefficient G(Rvlv) is obtained by a map based on the estimated operating state value Rvlv. For example, when the estimated operating state value Rvlv indicates a lift amount of the intake valves, the coefficient G(Rvlv) is set to become larger as the estimated operating state value Rvlv becomes larger, i.e., the lift amount of the intake valves becomes larger. In other words, the volumetric efficiency equivalency value Kin is calculated based on the engine speed Ne, the intake pressure Pcol and the estimated operating state value Rvlv.

In step S13, the estimated fresh intake air value Qac that flows into the combustion chamber 19, namely, the drawn in fresh intake air quantity excluding EGR gas is calculated and estimated using the following Equations (2) and (3) (fresh intake air quantity estimation method), which were explained above.

$$Qac = \frac{\frac{Qac_{n-1}}{Kin_{n-1}} \times Kkvol + Qacb}{1 + \frac{Kkvol}{Kin}} \quad (2)$$

$$Kkvol = \frac{120 \times Vcol}{Ve \times Ne \times dT} \quad (3)$$

In other words, in this embodiment, the estimated fresh intake air value Qac is estimated based on the detected fresh intake air quantity value Qacb and changes in the ratio $Kin/Kin_{n-1}$, i.e, in the volumetric efficiency equivalency value, which is the same as the first embodiment discussed above. Stated another way, the term Qac is found by the primary lag Equation (2) that uses the last calculated values $Qac_{n-1}$ and $Kin_{n-1}$. As is apparent from Equation (2), the estimated fresh intake air value Qac becomes larger as the ratio $Kin/Kin_{n-1}$ becomes larger. The estimated fresh intake air value Qac also becomes larger as the ratio $Qac_{n-1}/Kin_{n-1}$ of the last calculated value becomes larger. Thus, the estimated fresh intake air value Qac found in this manner is used in various control processes such as air-fuel ratio control, injection control and ignition control.

In step S14, the estimated value of the total intake air quantity Qsco2, which includes EGR gas that flows into the combustion chamber 19, is calculated and estimated by the following Equation (4) (total intake air quantity equivalent value estimation method), which is also used in the first embodiment.

$$Qcso2 = Qac\left(1 + Regr\frac{\lambda_0 - 1}{\lambda_0}\right) \quad (4)$$

In other words, the estimated total intake air quantity value Qsco2 is estimated based on the estimated fresh intake air value Qac, the estimated EGR rate value Regr and the air-fuel ratio $\lambda_0$. The estimated fresh intake air value Qac and the estimated total intake air quantity value Qsco2 that are found in this manner are used in various control processes. For example, the estimated total intake air quantity value Qsco2 is used in the setting process for the target fuel injection quantity and the air-fuel ratio control.

In this embodiment as described above, the volumetric efficiency equivalency value Kin is calculated using the adjustable intake valve operating state and the estimated fresh intake air value Qac estimated based on changes $Kin/Kin_{n-1}$ in this volumetric efficiency equivalency value Kin. In detail, the estimated fresh intake air value Qac becomes larger as $Kin/Kin_{n-1}$ becomes larger the estimated fresh intake air value Qac becomes smaller as $Kin/Kin_{n-1}$ becomes smaller. Therefore, the estimation accuracy of the estimated fresh intake air value Qac improves in a transition period during which the EGR rate primarily fluctuates. In addition, the estimation accuracy of the estimated total intake air quantity value Qsco2 can also be improved by estimating the estimated total intake air quantity value Qsco2 based on this the estimated fresh intake air value Qac and the estimated EGR rate value Regr. Because of this, the control accuracy of the setting process for the fuel injection quantity that utilizes the estimated fresh intake air value Qac and the estimated total intake air quantity value Qsco2 is improved and the exhaust performance and power performance are improved as well.

As shown in FIG. 1, if many components were placed in the air intake passage 3 between the airflow meter 35, that functions as a fresh intake air quantity detection device, and the combustion chamber 19, then the volume of the air intake passage 3 between the airflow meter 35 and the combustion chamber 19 will become unavoidably larger thereby making it very difficult to accurately estimate the fresh intake air quantity and intake air quantity up to this point. According to the present invention, this type of system is useful to make it possible to improve the estimation accuracy of the fresh intake air quantity and the total intake air quantity.

It will be apparent to those skilled in the art from this disclosure that various changes and modifications can be made to the present invention without departing from the essence of the present invention. For example, although the present invention is applied to a diesel engine in this embodiment, the present invention can also be applied to gasoline engines in the same manner.

Furthermore, although the volumetric efficiency equivalency value is calculated based on the estimated EGR rate value or the intake valve operating state in the embodiments discussed above, the volumetric efficiency equivalency value can be found using one or both in a system that changes the valve opening degree of the swirl control valve 9. In other words, step S10 of the FIG. 7 can be modified to determine or calculate the swirl control valve operating state of the swirl control valve 9 that is provided in the intake passage 3 in the vicinity of the air intake port of the engine 1. In particular, the coefficient G(Rvlv) used in Equation 4 to calculate the volumetric efficiency equivalency value Kin is replaced with the coefficient G(Rscv) that is obtained by a map based on the estimated operating state value Rscv of the swirl control valve 9.

Since the swirl control valve 9 is produces a swirling flow inside the combustion chamber 19 downstream of the airflow meter or sensor 35, this will affect the fresh intake air quantity drawn into the combustion chamber 19 without changing the detected value of the fresh intake air quantity passing through an air intake passage at the combustion chamber 19. The swirl control valve 9 is driven by an actuator (not shown) and opened and closed in response to a control signal from the control unit 5. For example, the swirl control valve 9 is preferably closed in a low load and low speed condition to produce a swirling flow inside the combustion chamber 19. Accordingly, the fresh intake air quantity estimation section of the control unit 5 is configured to adjust the volumetric efficiency equivalency value based on an operating state of the swirl control valve 9 as determined by the air adjustment section of the control unit 5.

In interpreting the present invention, the term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-285923. The entire disclosure of Japanese Patent Application No. 2003-285923 is hereby incorporated herein by reference.

As mentioned above, while only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine control system comprising:
   a fresh intake air quantity detection section configured to output a detected value of fresh intake air quantity passing through an air intake passage;
   an efficiency calculation section configured to calculate a volumetric efficiency equivalency value; and
   a fresh intake air quantity estimation section configured to estimate a predicted fresh intake air quantity value that flows into a combustion chamber based on variations in the fresh intake air quantity detected value and the volumetric efficiency equivalency value.

2. The engine control system as recited in claim 1, further comprising
an air adjustment section configured to determine an affect in the fresh intake air quantity drawn into the combustion chamber that occurs without changing the detected value of the fresh intake air quantity passing through the air intake passage, and
the fresh intake air quantity estimation section being further configured to adjust the calculate the volumetric efficiency equivalency value based on an operating state determined by the air adjustment section.

3. The engine control system as recited in claim 2, wherein
the efficiency calculation section is configured to calculate the volumetric efficiency equivalency value as follows:

$$Kin = \frac{f(Ne) \times G(Rvlv) \times Pcol}{Pa}$$

where
Kin is the volumetric efficiency equivalency value,
Ne is an engine rotation speed (RPM),
Rvlv is an adjustable intake valve actual operating equivalent value,
Pcol is a supercharging pressure, and
Pa is an atmospheric pressure.

4. The engine control system as recited in claim 2, further comprising
an EGR control section configured to control EGR towards at least one of a target EGR rate and a target EGR quantity, and
an EGR estimation section configured to estimate a predicted EGR value of at least one of an actual EGR rate and an actual EGR quantity based on the at least one of the target EGR rate and the target EGR quantity,
the efficiency calculation section being configured to calculate the volumetric efficiency equivalency value based on the predicted EGR value.

5. The engine control system as recited in claim 4, further comprising
a total intake air quantity equivalent value estimation section configured to estimate a predicted total intake air quantity equivalent value that flows into the combustion chamber based on the predicted EGR value and the predicted value of fresh intake air quantity.

6. The engine control system as recited in claim 5, further comprising
at least one of a compressor of a supercharger and an intercooler disposed in the air intake passage between a fresh intake air quantity detecting device and the combustion chamber.

7. The engine control system as recited in claim 4, further comprising
at least one of a compressor of a supercharger and an intercooler disposed in the air intake passage between a fresh intake air quantity detecting device and the combustion chamber.

8. The engine control system as recited in claim 1, further comprising
an EGR control section configured to control EGR towards at least one of a target EGR rate and a target EGR quantity, and
an EGR estimation section configured to estimate a predicted EGR value of at least one of an actual EGR rate and an actual EGR quantity based on the at least one of the target EGR rate and the target EGR quantity,
the efficiency calculation section being configured to calculate the volumetric efficiency equivalency value based on the predicted EGR value.

9. The engine control system as recited in claim 8, further comprising
a total intake air quantity equivalent value estimation section configured to estimate a predicted total intake air quantity equivalent value that flows into the combustion chamber based on the predicted EGR value and the predicted value of fresh intake air quantity.

10. The engine control system as recited in claim 9, further comprising
at least one of a compressor of a supercharger and an intercooler disposed in the air intake passage between a fresh intake air quantity detecting device and the combustion chamber.

11. The engine control system as recited in claim 8, further comprising
at least one of a compressor of a supercharger and an intercooler disposed in the air intake passage between a fresh intake air quantity detecting device and the combustion chamber.

12. The engine control system as recited in claim 1, wherein
the efficiency calculation section is configured to calculate the volumetric efficiency equivalency value as follows:

$$Kin = \frac{f(Ne) \times G(Regr) \times Pcol}{Pa}$$

where
Kin is the volumetric efficiency equivalency value,
Ne is an engine rotation speed (RPM),
Regr is a predicted EGR rate value,
Pcol is a supercharging pressure, and
Pa is an atmospheric pressure.

13. The engine control system as recited in claim 1, wherein
the fresh intake air quantity estimation section is configured to estimate the predicted value of the fresh intake air quantity as follows:

$$Qac = \frac{\frac{Qac_{n-1}}{Kin_{n-1}} \times Kkvol + Qacb}{1 + \frac{Kkvol}{Kin}} \text{ and } Kkvol = \frac{120 \times Vcol}{Ve \times Ne \times dT}$$

where
Qac is the predicted value of fresh intake air quantity drawn into the combustion chamber,
Kin is the volumetric efficiency equivalency value,
Qacb is a detected intake air quantity value,
$Qac_{n-1}$ is a last calculated value of Qac,
$Kin_{n-1}$ is a last calculated value of Kin,
Ne is an engine rotation speed (RPM),
Vcol is a collector capacity,
Ve is an exhaust quantity, and
dT is an calculation interval.

14. The engine control system as recited in claim 1, further comprising
an intake valve control section configured to control adjustments of a variable intake valve mechanism, and
an intake valve operating state predicting section configured to predict the operating state of the variable intake valve mechanism,
the efficiency calculation section being configured to calculate a volumetric efficiency equivalency value based on a predicted operating value of the variable intake valve mechanism.

15. The engine control system as recited in claim 14, wherein
the efficiency calculation section is configured to calculate the volumetric efficiency equivalency value as follows:

$$Kin = \frac{f(Ne) \times G(Rvlv) \times Pcol}{Pa}$$

where
Kin is the volumetric efficiency equivalency value,
Ne is an engine rotation speed (RPM),
Rvlv is an adjustable intake valve actual operating equivalent value,
Pcol is a supercharging pressure, and
Pa is an atmospheric pressure.

16. The engine control system as recited in claim 1, wherein
the efficiency calculation section is configured to calculate the volumetric efficiency equivalency value as follows:

$$Kin = \frac{f(Ne) \times G(Rvlv) \times Pcol}{Pa}$$

where
Kin is the volumetric efficiency equivalency value,
Ne is an engine rotation speed (RPM),
Rvlv is an adjustable intake valve actual operating equivalent value,
Pcol is a supercharging pressure, and
Pa is an atmospheric pressure.

17. An engine control system comprising:
fresh intake air quantity detecting means for outputting a detected value of fresh intake air quantity passing through an air intake passage;
efficiency calculation means for calculating a volumetric efficiency equivalency value; and
fresh intake air quantity estimation means for estimating a predicted fresh intake air quantity value that flows into a combustion chamber based on variations in the fresh intake air quantity detected value and the volumetric efficiency equivalency value.

18. A method of controlling an engine comprising:
detecting and outputting a detected value of fresh intake air quantity passing through an air intake passage;
calculating a volumetric efficiency equivalency value; and
estimating a predicted fresh intake air quantity value that flows into a combustion chamber for controlling an operation of the engine based on the fresh intake air quantity detected value and a variation in the volumetric efficiency equivalency value.

* * * * *